United States Patent
Yoshida et al.

(10) Patent No.: US 7,707,888 B2
(45) Date of Patent: May 4, 2010

(54) VIBRATION SENSOR AND METHOD OF DETECTING VIBRATION

(75) Inventors: Takahiko Yoshida, Okazaki (JP); Makiko Sugiura, Hekinan (JP)

(73) Assignee: Denso Corporation, Kariya (JP)

( * ) Notice: Subject to any disclaimer, the term of this patent is extended or adjusted under 35 U.S.C. 154(b) by 467 days.

(21) Appl. No.: 11/727,601

(22) Filed: Mar. 27, 2007

(65) Prior Publication Data

US 2007/0245804 A1    Oct. 25, 2007

(30) Foreign Application Priority Data

Apr. 19, 2006  (JP)  .............................. 2006-115459

(51) Int. Cl.
   *G01P 15/097*  (2006.01)
   *G01L 23/22*   (2006.01)
   *G01H 11/08*   (2006.01)

(52) U.S. Cl. .......................... 73/651; 73/652; 73/35.11; 73/35.09

(58) Field of Classification Search ................ 73/35.09, 73/35.11, 651, 652
   See application file for complete search history.

(56) References Cited

U.S. PATENT DOCUMENTS

| | | | |
|---|---|---|---|
| 4,337,641 A | | 7/1982 | Sugihara et al. |
| 4,341,189 A | | 7/1982 | Yamaguchi et al. |
| 4,448,059 A | * | 5/1984 | Kondo et al. ............... 73/35.09 |
| 4,463,610 A | * | 8/1984 | Anderson et al. ............. 73/654 |
| 4,465,047 A | | 8/1984 | Yamaguchi et al. |
| 4,479,389 A | * | 10/1984 | Anderson et al. ............. 73/651 |
| 5,616,514 A | | 4/1997 | Muchow et al. |
| 5,635,629 A | | 6/1997 | Imai et al. |
| 6,076,404 A | | 6/2000 | Muchow et al. |
| 6,084,257 A | * | 7/2000 | Petersen et al. ............. 257/254 |
| 6,263,736 B1 | * | 7/2001 | Thundat et al. ............ 73/514.36 |
| 6,311,557 B1 | * | 11/2001 | Davis et al. ............... 73/514.31 |
| 6,318,175 B1 | | 11/2001 | Muchow et al. |
| 6,336,366 B1 | | 1/2002 | Thundat et al. |

FOREIGN PATENT DOCUMENTS

| | | |
|---|---|---|
| DE | 3703946 | 7/1989 |
| DE | 102005050159 | 4/2007 |

(Continued)

OTHER PUBLICATIONS

Office Action dated Jul. 25, 2008 in corresponding German patent application No. 10 2007 017 480.4 (and English translation).

(Continued)

*Primary Examiner*—Hezron Williams
*Assistant Examiner*—Rose M Miller
(74) *Attorney, Agent, or Firm*—Posz Law Group, PLC

(57) ABSTRACT

A vibration sensor for detecting a vibration of a vibrating object includes a plurality of detecting members. Each of the detecting members includes a vibrating portion disposed to be separated from the vibrating object, a transmitting portion for transmitting the vibration from the vibrating object to the vibrating portion, and a detecting portion disposed on a vibrating face of the vibration portion. The detecting portion outputs an electrical signal corresponding to a resonance of the vibrating portion. At least two of the vibrating portions of the detecting members have resonance frequencies, which are different from each other.

18 Claims, 6 Drawing Sheets

FOREIGN PATENT DOCUMENTS

| | | | |
|---|---|---|---|
| JP | A-62-251670 | | 11/1987 |
| JP | A-5-157616 | | 6/1993 |
| JP | 08177697 A | * | 7/1996 |
| JP | A-8-177697 | | 7/1996 |
| JP | A-9-126876 | | 5/1997 |
| JP | A-2005-051687 | | 2/2005 |
| JP | A-2005-167820 | | 6/2005 |

OTHER PUBLICATIONS

Office Action dated Oct. 31, 2008 in corresponding Chinese patent application No. 200710097063.3 (and English translation).

Second Office Action dated Sep. 18, 2009 in corresponding Chinese patent application No. 200710097063.3 (and English translation).

Office Action mailed Feb. 9, 2010 from the Japan Patent Office in the corresponding patent application No. 2006-115459 (English translation enclosed).

* cited by examiner

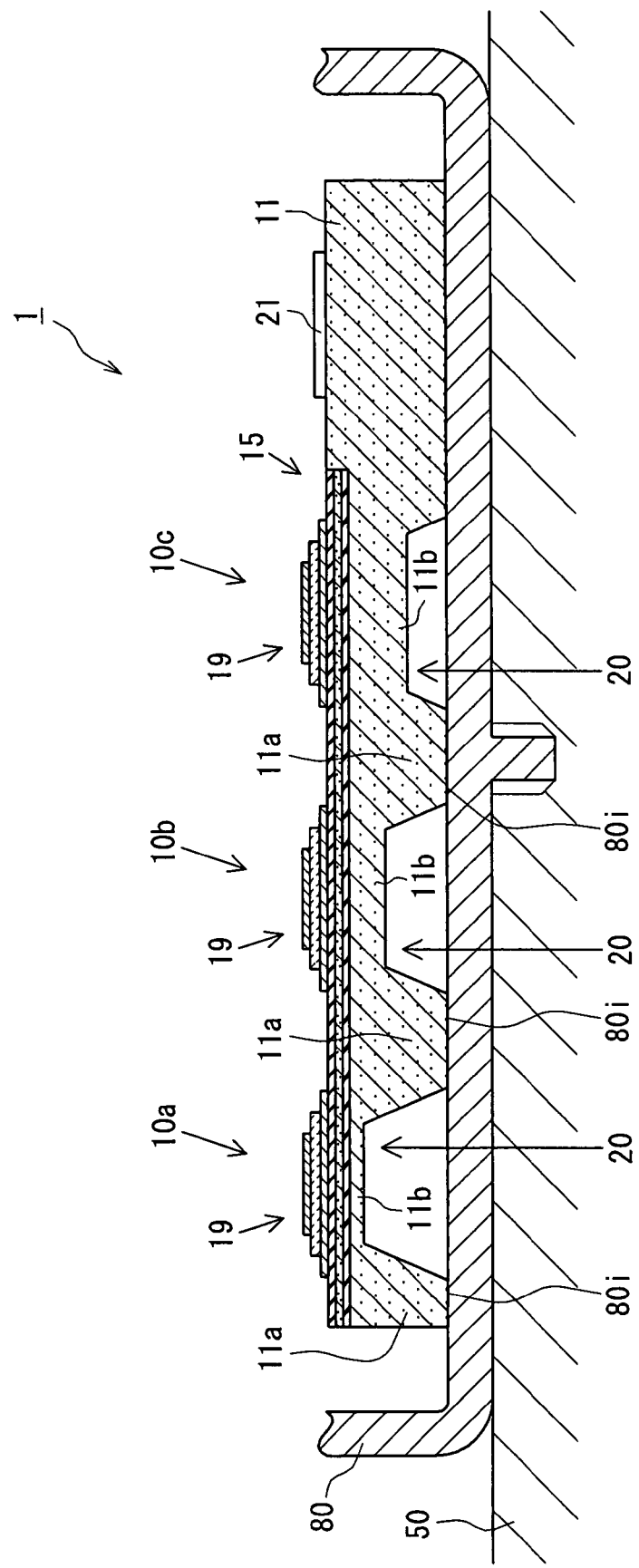

VIBRATION SENSOR AND METHOD OF DETECTING VIBRATION

CROSS REFERENCE TO RELATED APPLICATION

This application is based on Japanese Patent Application No. 2006-115459 filed on Apr. 19, 2006, the disclosure of which is incorporated herein by reference in its entirety.

BACKGROUND OF THE INVENTION

1. Field of the Invention

The present invention relates to a vibration-detecting sensor and a method of detecting vibration. The vibration-detecting sensor is mounted to a vibrating object, and detects vibration generated by the vibrating object.

2. Description of Related Art

A knock sensor, i.e., vibration sensor, for detecting engine knock vibration is mounted to a cylinder block of a vehicle engine, for example.

JP-A-9-126876 discloses a vibration sensor including a base, a silicon semiconductor substrate, a vibrating portion and a weight. The substrate is disposed on the base, and the vibrating portion is integrated with the substrate. The vibrating portion is displaced in accordance with the knock vibration. The weight is arranged on the vibrating portion such that the vibrating portion resonates with the knock vibration.

The vibration sensor detects the knock vibration due to the resonance of the vibrating portion. Therefore, the vibrating portion and the weight are set such that a natural frequency of the vibrating portion corresponds to a frequency of the knock vibration.

However, because the weight is required to be set in accordance with an engine type, many kinds of the weights are needed to correspond to many kinds of the engines. Therefore, productivity and general versatility of the vibration sensor are low.

Further, the vibration sensor detects only vibration in a narrow range of frequency set in accordance with the engine. Therefore, non-knock vibration generated by other factors except the knock vibration is difficult to be detected, and the vibration sensor is difficult to detect the knock vibration separately from general noise.

SUMMARY OF THE INVENTION

In view of the foregoing and other problems, it is an object of the present invention to provide a vibration-detecting sensor and a method of detecting vibration. According to the sensor and the method, vibration in a wide range of frequency can be detected.

According to a first example of the present invention, a vibration sensor detects a vibration of a vibrating object. The vibration sensor includes a plurality of detecting members. Each of the detecting members includes a vibrating portion, a transmitting portion and a detecting portion. The vibrating portion is disposed to be separated from the vibrating object. The transmitting portion is disposed between the vibrating object and the vibrating portion. The transmitting portion transmits the vibration from the vibrating object to the vibrating portion. The detecting portion is disposed on a vibrating face of the vibrating portion. The detecting portion outputs an electrical signal corresponding to a resonance of the vibrating portion. At least two of the vibrating portions of the detecting members have resonance frequencies, which are different from each other.

According to a second example of the present invention, a method of detecting a vibration includes a changing step and a detecting step. In the changing step, a resonance frequency of a vibrating portion is periodically changed in a predetermined variation range. In the detecting step, a resonance of the vibrating portion is detected, when a frequency of the vibration corresponds to the resonance frequency.

According to a third example of the present invention, a vibration sensor for detecting a vibration of a vibrating object includes a vibration detecting member. The vibration detecting member includes a vibrating portion disposed to be separated from the vibrating object, and a transmitting portion disposed between the vibrating object and the vibrating portion. The transmitting portion transmits the vibration from the vibrating object to the vibrating portion. The vibrating portion has a resonance frequency changing part periodically changing a resonance frequency in a predetermined range. The vibrating portion resonates with the vibration, when a frequency of the vibration corresponds to the resonance frequency. The vibrating portion includes a detecting part for detecting a resonance of the vibrating portion and outputting an electrical signal corresponding to the resonance of the vibrating portion.

Accordingly, vibration in a wide range of frequency can be detected.

BRIEF DESCRIPTION OF THE DRAWINGS

The above and other objects, features and advantages of the present invention will become more apparent from the following detailed description made with reference to the accompanying drawings. In the drawings:

FIG. 2 is a cross-sectional view showing the vibration sensor mounted to a vehicle engine;

DETAILED DESCRIPTION OF PREFERRED EMBODIMENTS

First Embodiment

A vibration sensor 1 shown in FIG. 2 is mounted to an engine box in a vehicle, and detects engine knock vibration in a first embodiment.

Figure 1A:
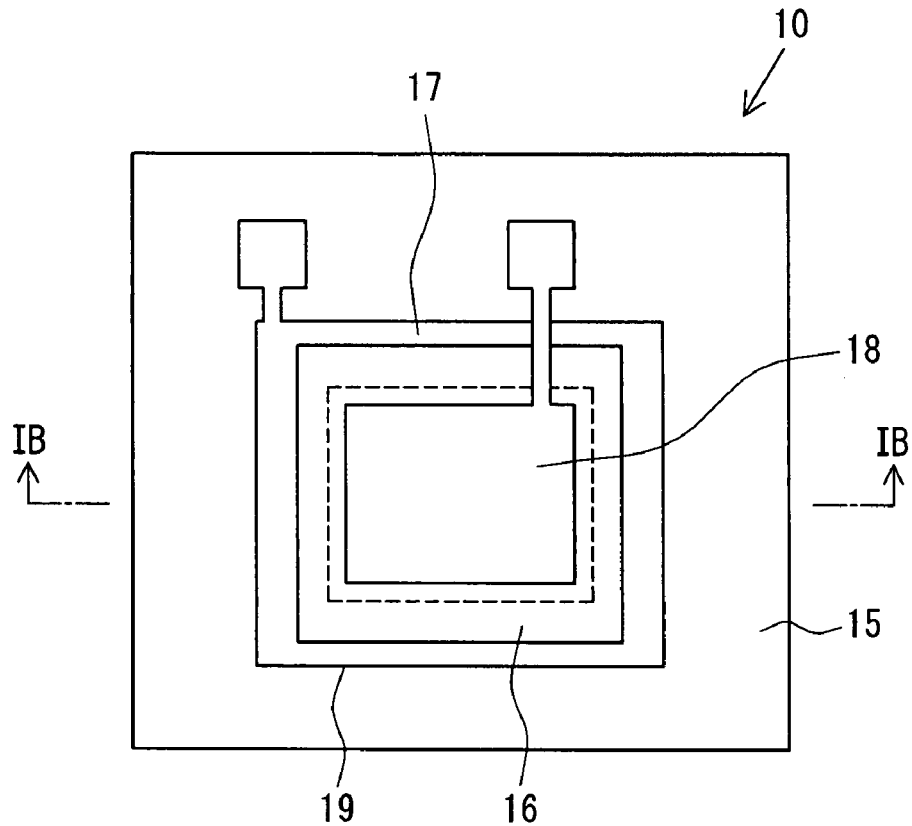
FIG. 1A is a plan view showing a detecting member of a vibration sensor according to a first embodiment of the present invention.

A detecting member 10 of the vibration sensor 1 will be described with reference to FIGS. 1A and 1B. The detecting member 10 includes a quadrangular semiconductor substrate 15 having a silicon on insulator (SOI) structure, in which a silicon base 11, a first insulation film 12, a silicon active layer 13 and a second insulation film 14 are layered in this order.

Figure 1B:
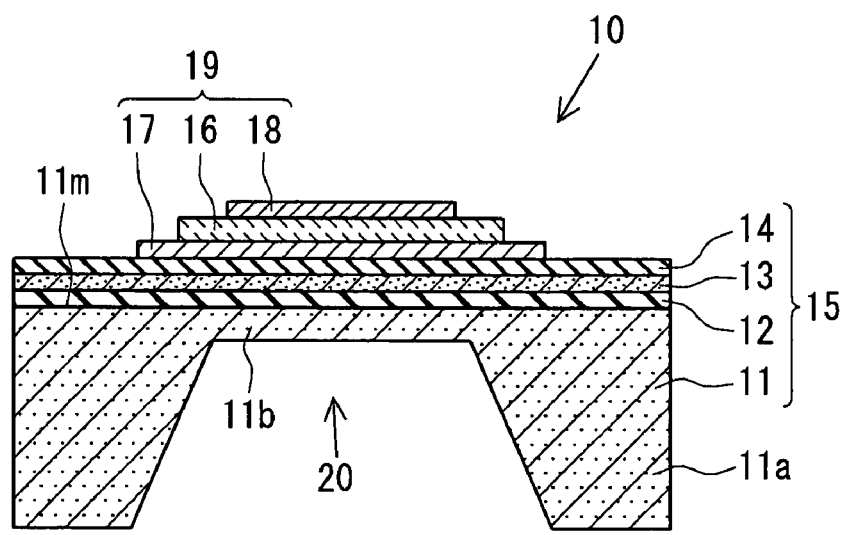
FIG. 1B is a cross-sectional view taken along line IB-IB in FIG. 1A.

As shown in FIG. 1B, an approximately center part of the base 11 is removed in a quadrangular shape by a micro electro mechanical system (MEMS) technology. Thereby, a frame-shaped transmitting portion 11a and a membrane-shaped beam 1b are formed in the silicon base 11. A membrane-shaped vibrating portion 20 is constructed with the beam 11b, the first insulation film 12, the silicon active layer 13 and the second insulation film 14 corresponding to a position of an aperture surrounded by the transmitting portion 11a. Here, the transmitting portion 11a connects the vibrating portion 20 to a vibrating object, and transmits vibration generated by the vibrating object to the vibrating portion 20.

A piezoelectric detecting portion 19 is disposed on the second insulation film 14. The detecting portion 19 includes a piezoelectric membrane 16 between a bottom electrode 17 and a top electrode 18. The piezoelectric membrane 16 is made of lead zirconate titanate (PZT), for example. Alternatively, the membrane 16 may be made of oxide zinc (ZnO), aluminum nitride (AlN) or lithium tantalate (LT). Alternatively, the membrane 16 may be made of organic film, e.g., polyvinylidene fluoride, or copolymer, e.g., fluorovinylidene-trifluoroethylene or tetrafluoroethylene.

When the vibrating object, e.g., an engine, generates knock vibration, the vibrating portion 20 receives the vibration and resonates with the vibration at a predetermined resonance frequency. A deformation of the vibrating portion 20 due to the resonance is converted into a voltage signal by the detecting portion 19. Then, the detecting portion 19 outputs the voltage signal. Thus, vibration can be detected. Because the vibrating portion 20 is thinly formed by the MEMS technology and supported by the transmitting portion 11a, the deformation of the vibrating portion 20 can be made larger. Therefore, detecting sensitivity can be improved.

The resonance frequency of the detecting member 10 can be changed by a thickness of the vibrating portion 20. In a case in which the silicon base 11 has a predetermined thickness, when the beam 11b is made thicker, the resonance frequency of the detecting member 10 becomes higher. That is, the resonance frequency of the detecting member 10 can be changed by the thickness of the beam 11b. Thereby, the detecting member 10 can have the predetermined resonance frequency.

As shown in FIG. 2, plural detecting members 10 (10a, 10b, 10c) are integrally formed in the single substrate 15. In the first embodiment, nine detecting members 10 are arranged in a three-by-three array, for example.

The detecting members 10a, 10b, 10c are disposed in a housing 80, and the transmitting portions 11a are fitted on an inner face 80i of the housing 80. That is, the vibrating portions 20 are not in contact with the housing 80. The housing 80 is disposed on an internal combustion engine 50 such that a face opposite to the inner face 80i is in contact with the engine 50.

The beam 11b is made thicker in an order of the detecting members 10a, 10b, 10c, thereby the resonance frequency of the vibrating portion 20 is made higher in this order of the detecting members 10a, 10b, 10c. For example, the resonance frequency of the vibrating portion 20 of the detecting member 10b corresponds to a frequency of knock vibration to be detected.

Here, the resonance frequencies of the detecting members 10 are set to cover a broad range of frequency, e.g., from several kHz to several MHz, including the frequency of the knock vibration. Thus, the vibration sensor 1 can detect vibration in the broad range of frequency. Therefore, when the engine 50 is exchanged by another engine, the vibration sensor 1 is not required to be adjusted in accordance with knock vibration to be generated by the another engine. Further, the vibration sensor 1 can accurately detect other vibrations different from the knock vibration.

In the first embodiment, the number of the detecting members 10 is nine. However, the number of the detecting members 10 is not limited to nine. The detecting members 10 are not limited to be arranged in the three-by-three array. Alternatively, each of the detecting members 10 may be formed into a sensor chip, and plural chips may be connected into an array.

Each of the detecting members 10 is electrically connected to a circuit member 21 on the base 11. Each of the detecting portions 19 outputs electrical signals into the circuit member 21, and the circuit member 21 performs calculations based on the signals. Then, the circuit member 21 outputs the calculated result into an electrical control unit (ECU) as a vibration signal. The ECU is electrically connected to the circuit member 21. Alternatively, the circuit member 21 may be disposed separately from the detecting members 10.

A knock vibration generated by the engine 50 is transmitted from the engine 50 to the housing 80, and further transmitted to each of the detecting members 10 through each of the transmitting portions 11a. Then, among the plural vibrating portions 20, only the vibrating portion 20 capable of resonating with the knock vibration can resonate. For example, only the vibrating portion 20 of the detecting member 10b resonates with the knock vibration. In this case, the vibrating portions 20 of the detecting members 10a, 10c do not resonate with the knock vibration. Thereby, a frequency of the knock vibration can be accurately detected. At this time, signals output from the detecting members 10a, 10c can be eliminated as noise components. Thus, detecting accuracy of the vibration sensor 1 can be improved.

Figure 3:
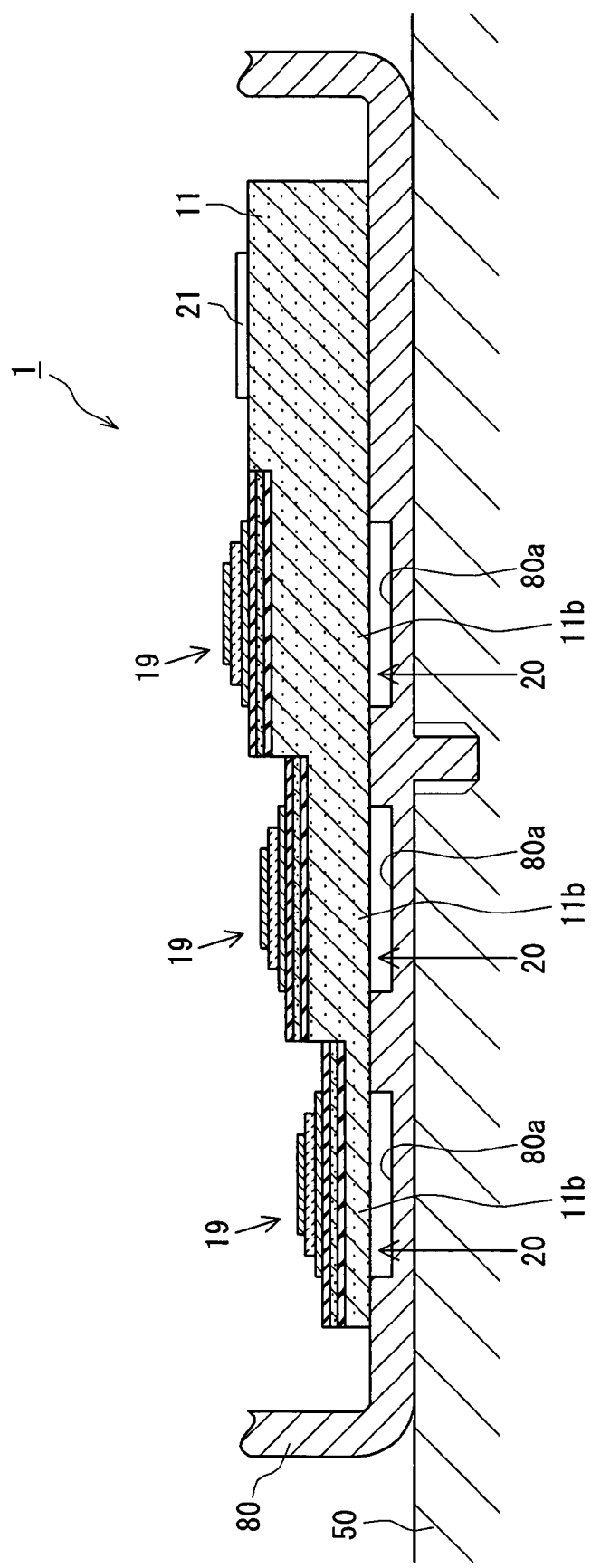
FIG. 3 is a cross-sectional view showing a modified vibration sensor of the first embodiment.

The shape of the detecting member 10 is not limited to the above-described shape. Alternatively, as shown in FIG. 3, the transmitting portion 11a may not be formed in the base 11. In this case, the beam 11b can be formed by providing an aperture 80a in the housing 80. Because a position of the aperture 80a corresponds to a position of the vibrating portion 20, a space is formed between the beam 11b and the housing 80 due to the aperture 80a, and the ends of the vibrating portion 20 are supported by the housing 80. Thus, the same advantages can be provided as a case in which the detecting member 10 has the transmitting portion 11a.

The piezoelectric detecting portion 19 is disposed on the vibrating portion 20 of the detecting member 10 in the first embodiment. Alternatively, a pair of electrodes facing each other and spaced from each other at a distance may be disposed on the vibrating portion 20 as a capacitive detecting portion. In this case, the resonance of the vibrating portion 20 is detected by a variation of a capacitance between the pair of electrodes.

According to the first embodiment, the resonance frequency is different among the detecting members 10, because the thickness of the vibrating portion 20 is different among the detecting members 10. Therefore, plural vibrations having different frequencies can be detected. The vibration sensor 1 is not required to be adjusted in accordance with a frequency of knock vibration to be detected, because the vibration sensor 1 can detect vibrations in a wide range of frequency. Further, the vibration sensor 1 can detect vibrations different from the knock vibration. Furthermore, a resonance frequency can be accurately and easily set in each of the detecting members 10, because the resonance frequency is changed by the thickness of the vibrating portion 20. Furthermore, manufacturing cost of the vibration sensor 1 can be reduced due to the simple structure.

Each of the vibration portions 20 is thinly formed in the semiconductor substrate 15, and can resonate with the knock vibrations. Therefore, an intensity of an electrical signal output from each detecting portion 19 can be increased. That is, a sensitivity of the vibration sensor 1 can be improved. Further, because the detecting portion 19 includes the electrodes 17, 18 and the piezoelectric membrane 16 between the electrodes 17, 18, a resonance frequency can have a sharp peak. Therefore, the sensitivity of the vibration sensor 1 can be more improved, because the detecting portion 19 has a high sensitivity.

A size of the vibration sensor 1 can be reduced in the example of FIG. 2, because the vibrating portion 20 and the transmitting portion 11a are formed in the single substrate 15. Thereby, the vibration sensor 1 can be freely mounted to the engine 50 as a knock sensor. Therefore, the vibration sensor 1 can be mounted to an appropriate position for detecting the knock vibration. Thus, the sensitivity of the vibration sensor 1 can be more improved.

Second Embodiment

Figure 4:
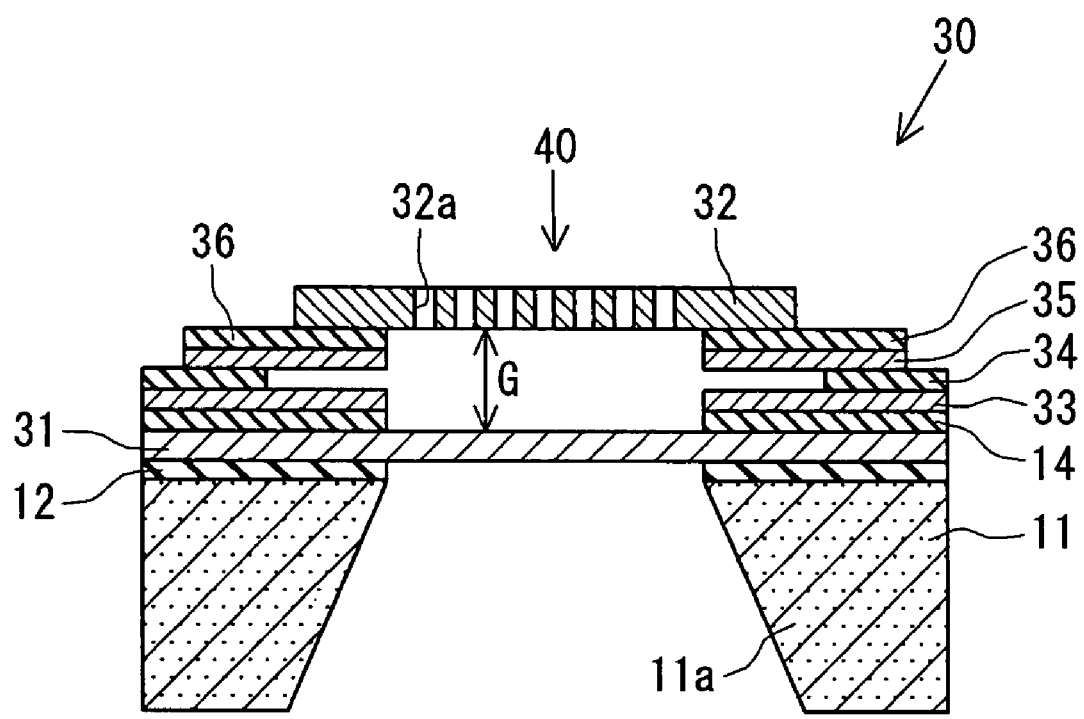
FIG. 4 is a cross-sectional view showing a detecting member of a vibration sensor according to a second embodiment.
Figure 5A:
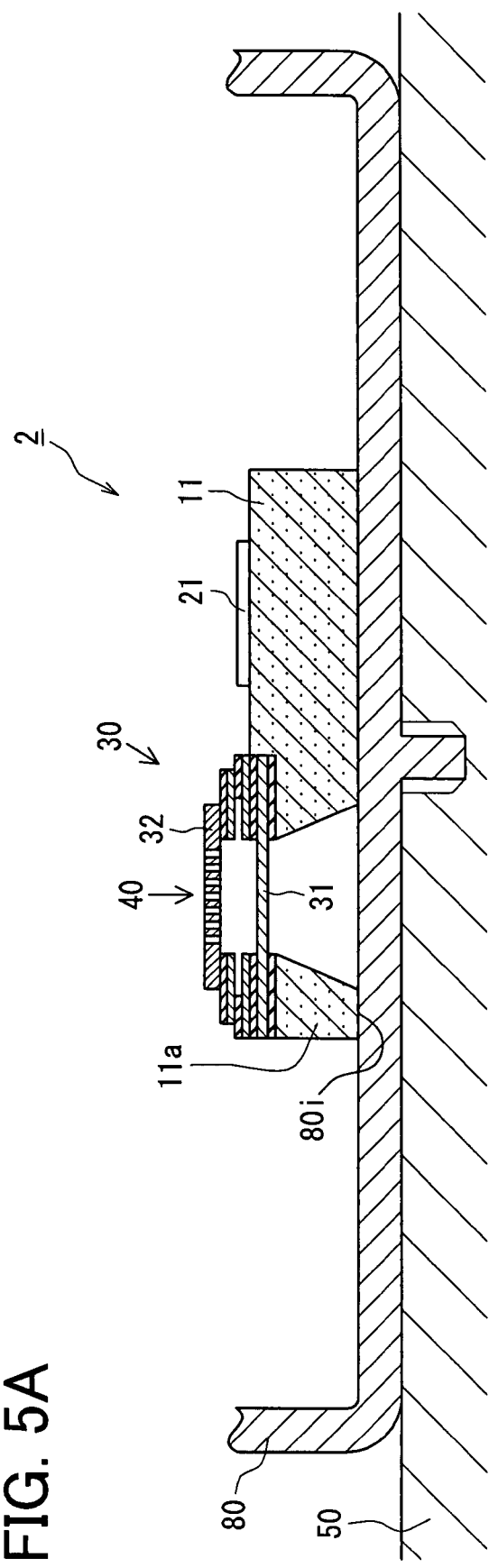
FIG. 5A is a cross-sectional view showing the vibration sensor of the second embodiment.
Figure 6A:
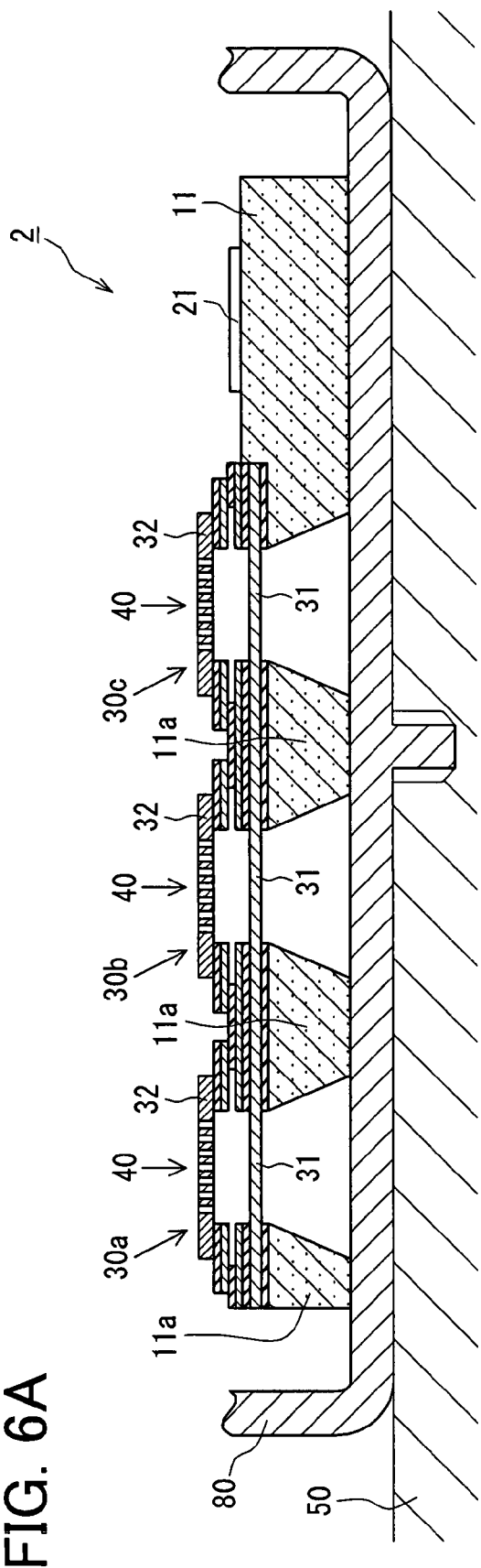
FIG. 6A is a cross-sectional view showing a modified vibration sensor of the second embodiment.

A vibration sensor 2 shown in FIGS. 5A and 6A includes at least a capacitive detecting member 30 shown in FIG. 4 in a second embodiment. The capacitive detecting member 30 detects vibration by a capacitance variation, while the detecting member 10 in the first embodiment piezoelectrically detects the vibration.

As shown in FIG. 4, an approximately center part of a base 11 is removed in a quadrangular shape in cross-section so as to form a transmitting portion 11a into a frame shape. A first insulation film 12 is arranged on the transmitting portion 11a. A quadrangular membrane-shaped first detecting electrode 31 is arranged on the transmitting portion 11a through the first insulation film 12 so as to cover an aperture surrounded by the transmitting portion 11a. The first detecting electrode 31 is made of a conductive material, e.g., poly-silicon. A second detecting electrode 32 is arranged above the first detecting electrode 31 through a gap having a dimension G therebetween. The second detecting electrode 32 has through holes 32a so as to reduce air damping. The pair of electrodes, i.e., the first and second detecting electrodes 31, 32, forms a capacitor, and detects a deformation (vibration) of a vibrating portion 40 by a capacitance variation.

The vibrating portion 40 includes the first detecting electrode 31, a second insulation film 14, a first gap-controlling electrode 33 (first controlling part), a third insulation film 34, a second gap-controlling electrode 35 (second controlling part), a fourth insulation film 36 and the second detecting electrode 32. The second insulation film 14, the first gap-controlling electrode 33, the third insulation film 34, the second gap-controlling electrode 35 and the fourth insulation film 36 are formed, respectively, into frame shapes, and layered in this order between the first detecting electrode 31 and the second detecting electrode 32.

The dimension G between the detecting electrodes 31, 32 in the film stacking direction is varied by an electrostatic force between the first and second gap-controlling electrodes 33, 35. That is, due to the gap-controlling electrodes 33, 35, the detecting electrodes 31, 32 can be displaced.

In order to generate the electrostatic force between the gap-controlling electrodes 33, 35, the third insulation film 34 covers a peripheral part of the first gap-controlling electrodes 33 and a peripheral part of the second gap-controlling electrodes 35. Thus, the gap-controlling electrodes 33, 35 face each other, and are spaced from each other to define a clearance.

A resonance frequency of the vibrating portion 40 can be changed by deformations (bendings) of the detecting electrodes 31, 32. When a voltage is applied between the gap-controlling electrodes 33, 35, an electrostatic action is generated between the gap-controlling electrodes 33, 35. Thereby, the gap-controlling electrodes 33, 35 attract each other. Thus, the dimension G between the detecting electrodes 31, 32 is reduced, and the deformation of the detecting electrode 31, 32 generates a stress to the detecting electrode 31, 32. Thereby, the resonance frequency of the vibrating portion 40 is made higher, because an apparent rigidity of the detecting electrode 31, 32 is increased. That is, the gap-controlling electrodes 33, 35 control the deformations of the detecting electrodes 31, 32. The resonance frequency of the vibrating portion 40 may be controlled by the deformations of both the detecting electrodes 31, 32. Alternatively, the resonance frequency of the vibrating portion, 40 may be controlled by either one of the deformations of the first and second detecting electrodes 31, 32.

As shown in FIG. 5A, the detecting member 30 is disposed in the housing 80, and the transmitting portion 11a is fitted on an inner face 80i of the housing 80. The detecting member 30 is electrically connected to a circuit member 21 on the base 11. A voltage signal output from the vibrating portion 40 is input into the circuit member 21. The circuit member 21 performs calculations based on the voltage signal, and outputs the calculated result into the ECU as a vibration signal. Further, the circuit member 21 controls the dimension G between the detecting electrodes 31, 32 by changing the voltage applied between the gap-controlling electrodes 33, 35. Thus, the resonance frequency of the vibrating portion 40 can be changed in accordance with a predetermined control pattern.

Knock vibration generated by the engine 50 is transmitted to the detecting member 30, similarly to the first embodiment. Then, the vibrating portion 40 vibrates, and the dimension G between the detecting electrodes 31, 32 is varied in accordance with a frequency of the vibration of the vibrating portion 40. Thereby, the knock vibration can be detected, because the capacitance of the capacitor constructed with the first and second detecting electrodes 31, 32 is varied.

Here, the resonance frequency of the detecting member 30 periodically changes in a predetermined variation range. When a frequency of knock vibration corresponds to the resonance frequency, the vibrating portion 40 resonates with the knock vibration. Thereby, amplitude of the resonance of the vibrating portion 40 is increased, and the variation of the dimension G is increased. Thus, the variation of the capacitance is increased. Therefore, detecting sensitivity of the vibration sensor 2 can be improved.

Figure 5B:
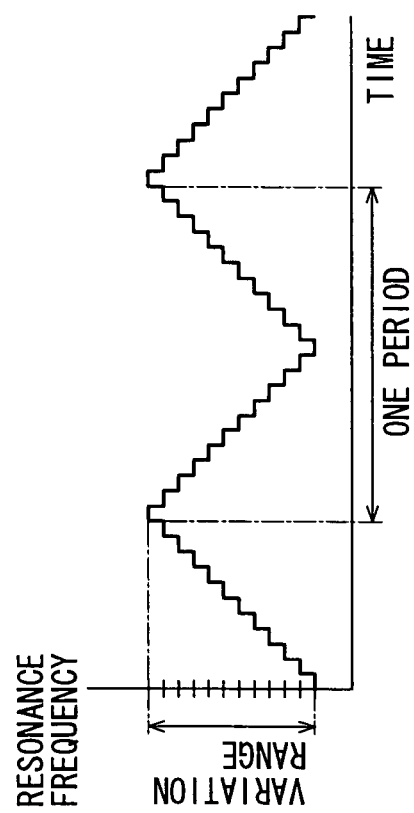
FIG. 5B is a graph showing a relationship between a time and a resonance frequency in the vibration sensor.

For example, as shown in FIG. 5B, the resonance frequency changes stepwise, when the dimension G is made to vary stepwise in a predetermined period. The variation range of the resonance frequency is preferably set to have a broad range of frequency, e.g., from several kHz to several MHz, including the frequency of the knock vibration, similarly to the first embodiment. Thus, the vibration sensor 2 can detect vibration in a broad range of frequency. Therefore, even when the engine 50 is changed to another engine, the vibration sensor 2 is not required to be adjusted in accordance with knock vibration to be generated by the another engine. Further, other vibrations different from the knock vibration can be detected. Furthermore, a size of the vibration sensor 2 can be reduced, because the vibration sensor 2 includes only one detecting member 30.

However, the vibration sensor 2 may include plural (e.g., three) detecting members 30a, 30b, 30c, as shown in FIG. 6A.

Figure 6C:
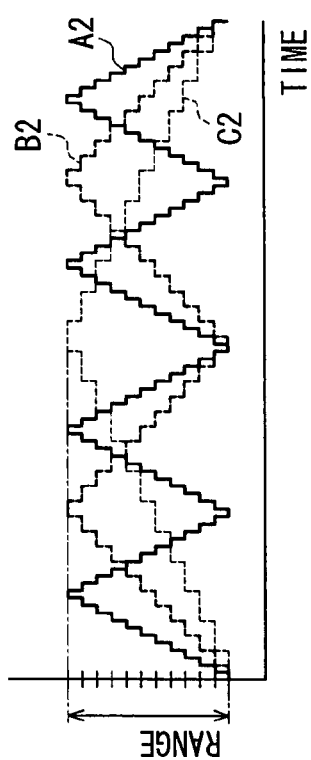
FIG. 6C is another graph showing a relationship between a time and a resonance frequency in the modified vibration sensor.
Figure 6B:
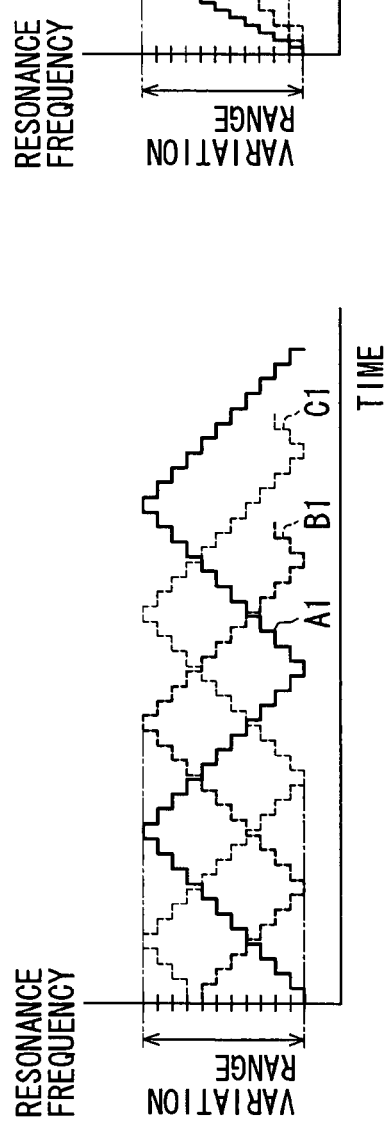
FIG. 6B is a graph showing a relationship between a time and a resonance frequency in the modified vibration sensor.

In this case, as shown in FIG. 6B, a resonance frequency of the detecting member 30a is set to have a variation pattern A1, a resonance frequency of the detecting member 30b is set to have a variation pattern B1, and a resonance frequency of the detecting member 30c is set to have a variation pattern C1, for example. That is, the variation patterns A1, B1, C1 of the resonance frequencies of the detecting members 30a, 30b, 30c are offset relative to a time. Thereby, at least two or more resonance frequencies are always different from each other. Therefore, vibrations in a wide range of frequency can be detected, because the detecting members 30a, 30b, 30c have different resonance frequencies. Thus, a detecting sensitivity of the vibration sensor 2 can be improved.

As shown by A2, B2, C2 in FIG. 6C, time range of the variation patterns A1, B1, C1 may be made different from each other. For example, the variation patterns A2, B2, C2 have longer time ranges in this order. Thereby, the variation patterns A2, B2, C2 are offset from each other relative to a time, and at least two or more resonance frequencies are always different from each other.

Alternatively, the resonance frequencies of the detecting members 30a, 30b, 30c may have different variation ranges. In this case, at least two or more resonance frequencies are always different from each other. Further, the variation range of the resonance frequency can be wide. When the resonance frequencies of the detecting members 30a, 30b, 30c have different variation ranges, the detecting members 30a, 30b, 30c may have different constructions. For example, the first and second detecting electrodes 31, 32 may have thicknesses different among the detecting members 30a, 30b, 30c. Thus, the vibrating portions 40 of the detecting members 30a, 30b, 30c can easily resonate in the wide variation range.

According to the second embodiment, the resonance frequency of the vibrating portion 40 periodically changes in the predetermined variation range, because the deformations of the detecting electrodes 31, 32 are varied by the gap-controlling electrodes 33, 35. When a frequency of vibration, e.g., knock vibration, corresponds to the resonance frequency, the vibrating portion 40 resonates with the corresponding vibration.

Thereby, vibrations in a wide range of frequency can be detected by the single detecting member 30. The vibration sensor 2 is not required to be adjusted in accordance with a frequency of vibration generated by the engine 50. Further, vibrations different from the knock vibration can be detected by the vibration sensor 2. Furthermore, a size of the vibration sensor 2 can be reduced in the example of FIG. 5, because the vibration sensor 2 includes only one detecting member 30.

In a case in which the vibration sensor 2 includes plural detecting members 30, at least two or more resonance frequencies are always different from each other. Therefore, vibrations in a wide range of frequency can be detected, because the detecting members 30a, 30b, 30c always have different resonance frequencies. Thus, a detecting sensitivity of the vibration sensor 2 can be improved.

Other Embodiments

The vibration sensor 1, 2 is mounted to the vehicle engine 50 as one example of the vibrating object, in the above embodiments. However, the vibration sensor 1, 2 may be mounted to an apparatus other than the vehicle. For example, the vibration sensor 1, 2 may be mounted to a vibrating object, e.g., machine tool, and detect vibration generated by a movable portion of the machine tool.

In the above-described first embodiment, at least two of the vibrating portions 19 can have different resonance frequencies.

Such changes and modifications are to be understood as being within the scope of the present invention as defined by the appended claims.

What is claimed is:

1. A method of detecting a vibration, the method comprising:
   changing a resonance frequency of a vibrating portion periodically in a predetermined range;
   detecting a resonance of the vibrating portion, when a frequency of the vibration corresponds to the resonance frequency using a capacitive detecting part of the vibrating portion, wherein the capacitive detecting part includes a pair of electrodes facing each other and spaced from each other at a predetermined clearance, and a capacitance of the capacitive detecting part varies in accordance with a resonance of the vibrating portion, and
   the changing includes deforming each one of the pair of electrodes by using a deformation controlling part provided in the vibrating portion.

2. The method according to claim 1, wherein
   the vibrating portion is one of a plurality of vibrating portions in which the resonance frequencies are different, and
   the changing is performed such that at least two of the resonance frequencies are always different from each other.

3. The method according to claim 1, wherein
   the vibration is generated by an internal combustion engine in a vehicle.

4. The method according to claim 3, wherein
   the predetermined range of the resonance frequency includes a frequency of a vibration generated by the engine.

5. The method according to claim 1, wherein
   the detecting part has a space closed by the pair of electrodes.

6. The method according to claim 1, wherein
   the pair of electrodes are arranged to be parallel with each other and have respective deformation directions opposite from each other.

7. The method according to claim 1, wherein the detecting part has through holes to reduce air damping.

8. The method according to claim 1, wherein the changing further comprises controlling the deformation of each one of the pair of electrodes with the deformation controlling part to improve detection sensitivity.

9. A vibration sensor for detecting a vibration of a vibrating object, the sensor comprising:
   a vibration detecting member including
      a vibrating portion disposed to be separated from the vibrating object, wherein the vibrating portion resonates with the vibration when a frequency of the vibration corresponds to a resonance frequency of the vibrating portion, and
      a transmitting portion disposed between the vibrating object and the vibrating portion, the transmitting portion transmitting the vibration from the vibrating object to the vibrating portion, wherein
   the vibrating portion includes
      a resonance frequency changing part for periodically changing the resonance frequency in a predetermined range, and a detecting part for detecting a resonance of the vibrating portion and outputting an electrical signal corresponding to the resonance of the vibrating portion wherein the detecting part of the vibrating portion includes a capacitor made of a pair of electrodes, and detects the resonance of the vibrating portion based on a capacitance of the capacitor, and the resonance frequency changing part of the vibrating portion controls deformation of each one of the pair of electrodes.

10. The vibration sensor according to claim 9, wherein
the vibration detecting member is one of a plurality of vibration detecting members, and
the vibrating portions of the plurality of vibration detecting members have at least two different resonance frequencies.

11. The vibration sensor according to claim 9, wherein
the vibrating object is an internal combustion engine in a vehicle.

12. The vibration sensor according to claim 11, wherein
the predetermined range of the resonance frequency includes a frequency of a vibration generated by the engine.

13. The vibration sensor according to claim 9, wherein
the resonance frequency changing part of the vibrating portion is made of a pair of film-shaped electrodes, which generate electrostatic action therebetween when a voltage is applied thereto.

14. The vibration sensor according to claim 9, wherein
the detecting part has a space closed by the pair of electrodes.

15. The vibration sensor according to claim 9, wherein
the pair of electrodes are arranged to be parallel with each other and have respective deformation directions opposite from each other.

16. The vibration sensor according to claim 9, wherein the detecting part has through holes to reduce air damping.

17. The vibration sensor according to claim 9, wherein the resonance frequency changing part controls the deformation of each one of the pair of electrodes to improve detection sensitivity.

18. The vibration sensor according to claim 9, wherein the resonance frequency changing part controls the deformation of each one of the pair of electrodes to thereby control dimensions of a gap between the pair of electrodes.

* * * * *